Oct. 13, 1931.  A. NOVICK  1,827,539
MAKING ENVELOPES AND MACHINE THEREFOR
Original Filed Sept. 1, 1927  5 Sheets-Sheet 1

INVENTOR
Abraham Novick
BY
Harry Jacobson
ATTORNEY

Oct. 13, 1931.  A. NOVICK  1,827,539
MAKING ENVELOPES AND MACHINE THEREFOR
Original Filed Sept. 1, 1927  5 Sheets-Sheet 3

Fig. 3

INVENTOR
Abraham Novick
BY
Harry Jacobson
ATTORNEY

Oct. 13, 1931.  A. NOVICK  1,827,539
MAKING ENVELOPES AND MACHINE THEREFOR
Original Filed Sept. 1, 1927  5 Sheets-Sheet 4

INVENTOR
Abraham Novick
BY
Harry Jacobson
ATTORNEY

Oct. 13, 1931.  A. NOVICK  1,827,539

MAKING ENVELOPES AND MACHINE THEREFOR

Original Filed Sept. 1, 1927   5 Sheets-Sheet 5

INVENTOR
Abraham Novick
BY
Harry Jacobson
ATTORNEY

Patented Oct. 13, 1931

1,827,539

UNITED STATES PATENT OFFICE

ABRAHAM NOVICK, OF FLUSHING, NEW YORK

MAKING ENVELOPES AND MACHINE THEREFOR

Application filed September 1, 1927, Serial No. 216,821. Renewed January 23, 1931.

This invention relates to the method of making window envelopes and to a machine for making such envelopes and for carrying my improved method into effect. In said method, a stack of envelope blanks of the proper shape and size are provided, the blanks each having a window opening made therein. A single blank at a time is removed from the top of the stack, and is arranged under the preceding blank, but projects rearwardly by a predetermined amount sufficient to expose only the seal flaps of all of the overlapped blanks excepting the first. The overlapping blanks are then carried along continuously while the various operations are performed thereon to form them into complete envelopes. These operations include the continuous gumming and drying of the seal flaps, spacing the blanks after the seal flaps have dried, gumming the periphery of the window opening, cutting a patch of transparent paper from a roll, applying the cut patch to the gummed window, scoring the blank on the fold lines of the various flaps, folding the side flaps, gumming the bottom flap for attachment to the folded side flaps, folding the bottom flap, and finally folding the seal flap. As has been mentioned, all of the steps in my improved process are performed while the blank is continuously in motion.

My improved machine is designed as a typical means for carrying out my improved process effectively and at high speeds.

The various objects of my invention will appear as this description progresses, reference being made to the accompanying drawings, in which.

Figs. 8 to 15 inclusive are top plan views of the blanks as they appear during the various steps of my improved method. In detail.

My improved process will be described hereinafter in connection with a preferred machine for carrying out the process.

In that particular practical embodiment of my machine, which I have illustrated in its preferred form, it will be understood that the various shafts carrying and imparting movement to the sub-instrumentalities are interconnected and driven by suitable gearing or other well known drive mechanism, in a manner well known in the art, and which therefore need not be shown nor described in detail, except in connection with the patch severing and applying mechanism.

Figures 4, 6:
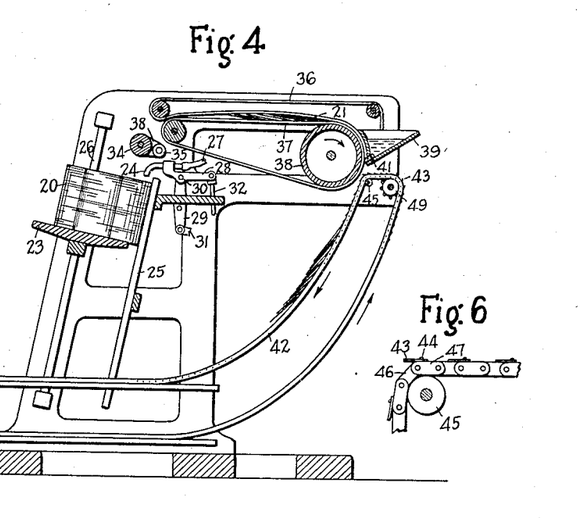
Fig. 4 is a vertical section of the front end of my improved machine showing in diagrammatic fashion, the mechanism for arranging the blanks in overlapping relation, for gumming the seal flap and forwarding the blanks continuously to be further operated upon while retaining control thereof.
Fig. 6 is a side view of the blank forwarding chain and of the blank gripping means thereon.

A stack 20 of previously cut blanks 21 each having a window opening as 22 already made therein, is supplied to the table 23. The table is suitably supported for adjustment relatively to the suction nozzle 24, the stack 20 being held in proper position by means of adjustable rods 25 and 26 (Fig. 4). Air is withdrawn from the nozzle 24 through the hose 27 connected to a suction pump, not shown, of the usual type suitable for the purpose described.

For lifting the uppermost blank from the stack, the nozzle 24 is given a swinging motion by means of the lever 28 on which it is mounted. Said lever is swung bodily by means of the rocking lever 29, secured to the nozzle lever at one end 30 thereof, and operated by the connecting rod 31 at the other end thereof. A suitable crank on any of the continuously rotating shafts of the machine may be utilized to give the connecting rod 31 the proper stroke. Rocking of the nozzle lever about its pivot may be effected by the reciprocating rod 32.

The suction nozzle delivers the leading edge 33 of the blank to the grip of the continuously rotating rolls 34 and 35, which serve to forward the blanks to and between the advancing belts 36 and 37. The roll 35, however, being mounted on a swinging bracket or arm 38 pivoted on the shaft for the roll 34, may be swung about, while in contact with the roll 34. The roll 35, being formed of a pair of separated cylinders have a clear space therebetween near the suction nozzle, it becomes possible to swing the roll 35 down about the axis of the roll 34 to engage the under face of the blank after the leading edge has been lifted by the nozzle and before the suction nozzle releases said edge. It will be understood that the roll 35 is swung back to its initial position while continuously forwarding the blank and while the nozzle is being brought down to the top of the stack in readiness to remove and forward the next blank. It will also be understood that the operation of the nozzle is such that blanks are forwarded to the rolls in rapid succession so that they overlap one another to expose the seal flaps thereof at the rear edges of the blanks.

Figure 5:
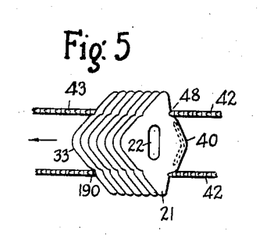
Fig. 5 is a top plan view of the overlapped blanks and of the chain for gripping and forwarding the blanks continuously.

Both of the endless belts 36 and 37 are continuously operated and serve to carry the overlapped blanks to and about the drum 38 it being understood that said belts so engage the blank as to leave the seal flap clear. A suitable gum box 39 applies gum to the exposed seal flaps 40 continuously as the overlapped blanks pass said box, the surplus gum being wiped back by means of the bottom edge of the gum box or a felt gumming member 41. The passage of the blanks into the grip of the chains will now be described. The belts 36 and 37 retain control of the blank while the seal flap thereof is being gummed and the major portion of the blank forwarded to lie on the chains 42 and until the blank is gripped by the chains. Said chains are spaced apart a distance about equal to the distance between the indented corners 190 of the blank so that the blank may rest on the chains without interference by the chains with the wet seal flap, which, when the blank has been released by the gumming device and belts and rests on the chains, is undermost. Spring clips as 43 are each secured at one of the ends thereof to the chains at spaced intervals, equal substantially to the transverse width of the exposed seal flaps, by suitable screws or rivets 44. It will be seen (Fig. 6) that when the chain is bent, as about the roller 45 the link 46 of the chain, adjacent to that link 47 on which the clip is secured, becomes angularly disposed to the clip link 47, and allows the clip 43 to project somewhat thereover. When the blank is about to be released by the belts 36 and and 37 and passes the gumming member 41, it rests on the chains 42 with the indented corners 48 thereof underneath the clips 43, so that on the slight advance of the chain and the consequent straightening of the link 46 into alignment with the link 47, the corners 48 of the blank are gripped by the clips 43 and the blank is carried forwardly thereby, to the other end of the machine, the blanks retaining their arrangement in overlapping relation, but having been reversed in position relatively to their position in the belts 36 and 37 (Fig. 5).

The chains 42 are made of sufficient length to enable the wet seal flap to dry during the time the blanks are carried from one end of the machine to the other. Suitable sprocket wheels as 49 and 50 serve to advance the chain continuously, the blanks being carried thereby about the drum 51 (Fig. 7), from the under side to the upper side thereof, whereby the blanks are again positioned in the same relation as when first removed from the stack, that is, overlapping each other and with the leading edge 33 nearest the front of the machine.

Figure 7:
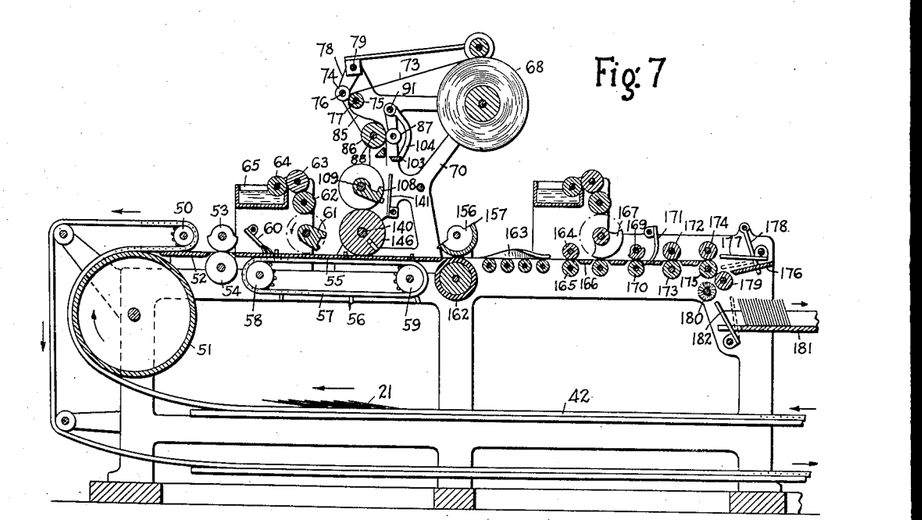
Fig. 7 is a view similar to Fig. 4 of the remainder of the machine, showing more or less diagrammatically the various sub-mechanisms for forming the blank into a finished window envelope.
Figure 8:
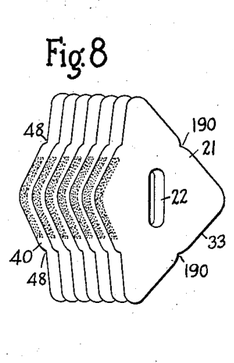
Fig. 8 is a top plan view of the blanks as they appear when delivered to the rear end of the machine with the dried seal flap uppermost.

From the chains 42, the blanks are delivered to the plate 52 and between the rolls 53 and 54 it being understood that the clips 43 release their hold on the blanks as the successive clip links 47 are turned about the sprocket wheel 50. Both of said rolls 53 and 54 are continuously rotated, at a higher circumferential speed than the linear speed of the chain, but the roll 53 is partly cut away so that the blank may enter between the rolls without being gripped therebetween until the clips 43 let go. By reason of the increased speed of the rolls 53 and 54, the blanks are successively speeded up sufficiently to separate them from each other upon the table or plate 55.

Figure 9:
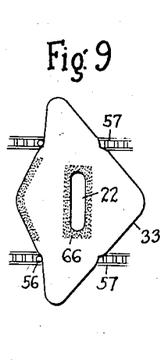
Fig. 9 is a similar view of a blank after the window thereof has been gummed preparatory to the application of a patch, and of the aligning and forwarding pins on the continuously moving chain.
Figure 10:
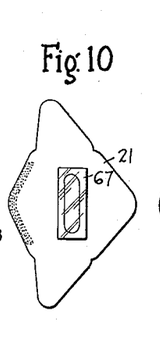
Fig. 10 is a similar view of the blank after the patch has been applied thereto.

Proper alignment and accurate relative positioning of the blanks with respect to the remaining mechanism intended to operate thereon, is effected by means of the pins 56, which project at intervals greater than the length of the blank from the endless chain 57. Continuously rotating sprocket wheels 58 and 59 impart continuous movement to the chain 57. The pins 56 project up into the path of the blank through suitable slots 70 in the plate 55, the blank being slightly retarded in its movement on said plate by suitable friction means, such as the brushes 60. When the leading edge 33 of the blank is delivered to the plate 55, the pins 56, which are later brought by the chain 57 into engagement with the corners 48 of the blank, are down below the plate out of the way. As the seal flap is released by the rollers 53 and 54 the pins 56 are carried up by the chain 57 to project up above the plate 55 through the slots 70 and are caused to engage the corners 48 and to properly space and align the blank, said pins carrying the blank across the plate during the gumming, patch severing and applying operations and into position for the scoring operation.

Gum is applied about the window opening 22 to the upper surface of the blank during its movement on the plate 55. For this purpose, the continuously revoluble gumming die 61 is suitably shaped and receives gum from the roller 62, which in turn is supplied with gum by the rollers 63 and 64 from the gum box 65. The gumming movement of the die 61 and the pins 56 are synchronized so that the layer of gum 66 is applied about the periphery of the window opening in readiness to have a patch 67 of transparent paper secured thereto, while the blank is in motion.

The mechanism for severing a patch from the roll 68 and for delivering said patch into proper position on the blank will now be described (Figs. 1, 2, 3 and 7).

Figure 1:
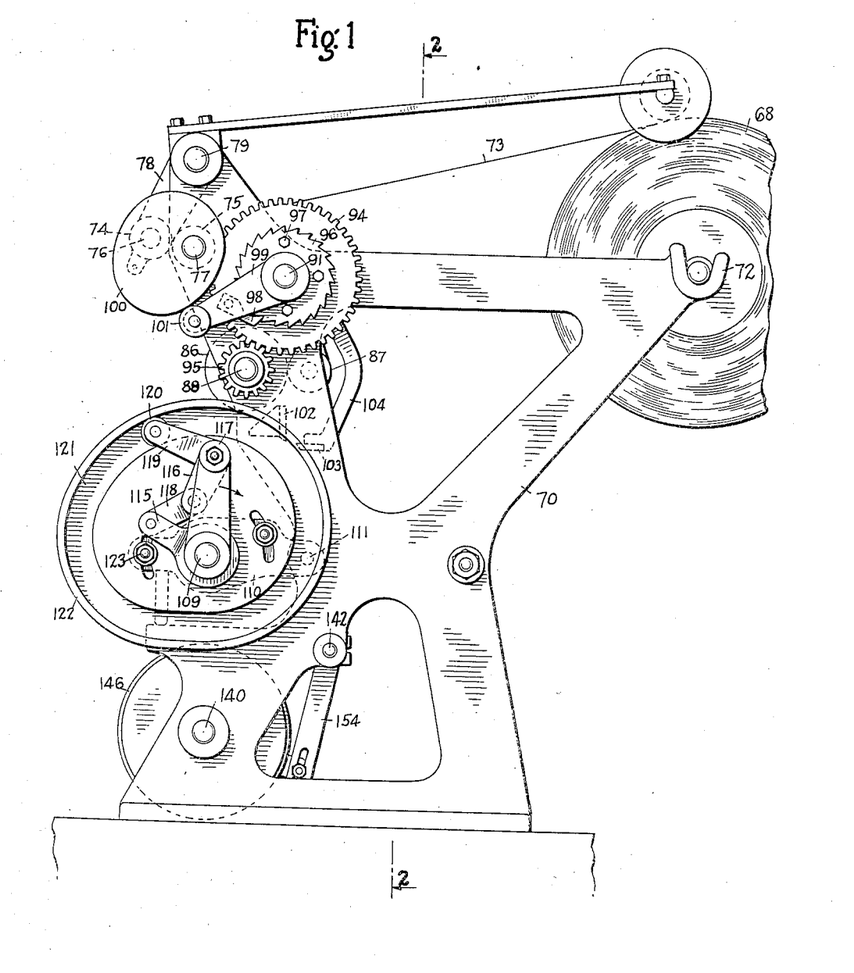
Fig. 1 is a side elevation of the mechanism which I prefer to use for cutting off and applying a transparent patch to the envelope window.
Figure 2:
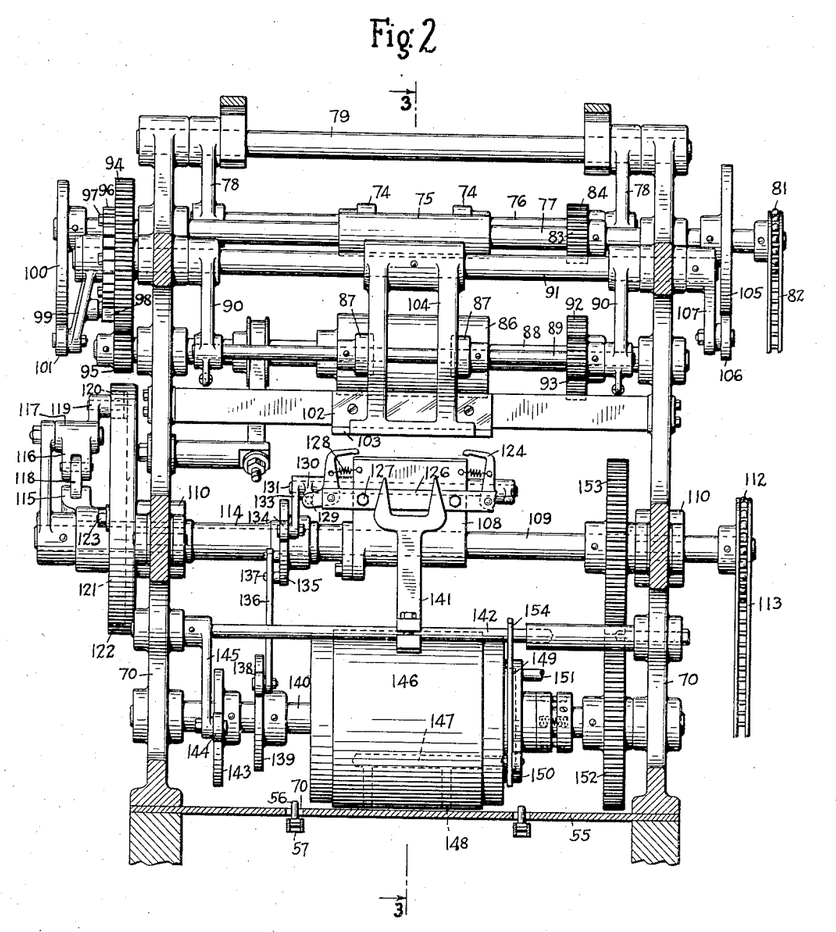
Fig. 2 is a vertical section of the same taken on the line 2—2 of Fig. 1.
Figure 3:
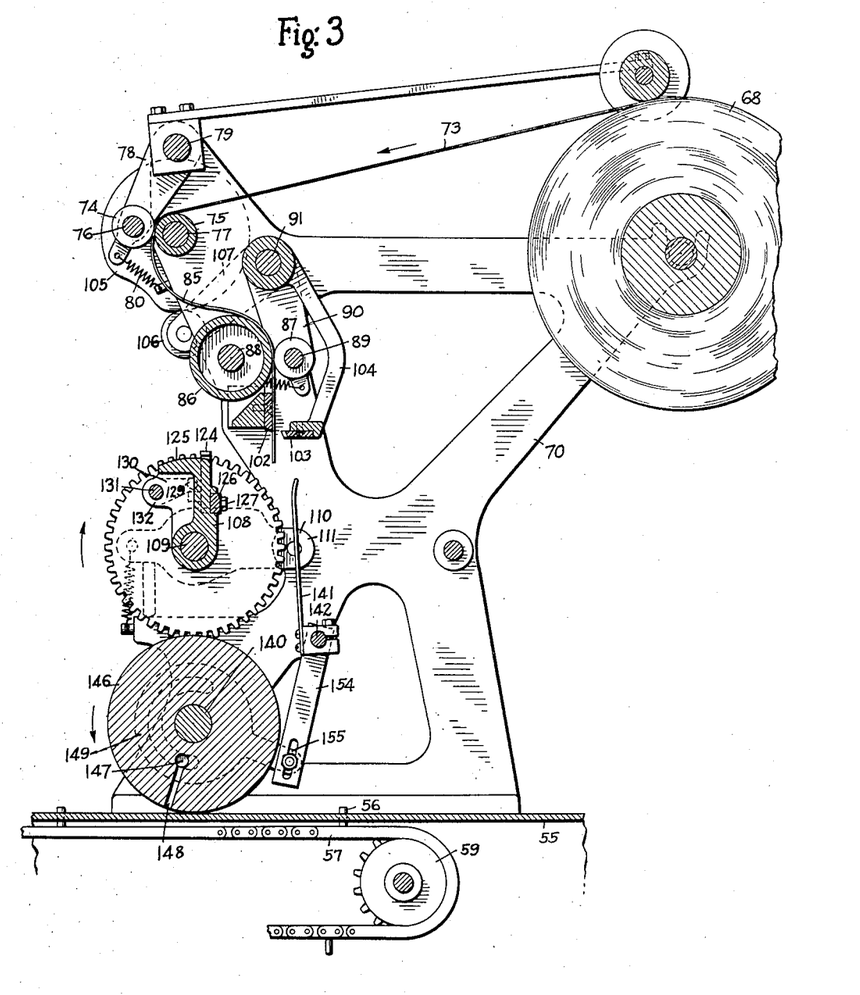
Fig. 3 is a vertical section of the same taken on the line 3—3 of Fig. 2.

The auxiliary frames 70 support the roll 68 of transparent paper as by means of a suitable shaft resting in the bearing 72, and serve also to support the various other shafts of the patch mechanism. The web 73 of transparent paper is threaded between the advancing rolls 74 and 75 on the shafts 76 and 77 respectively. For supporting the shaft 76, the bracket 78 is loosely mounted on the shaft 79 which is supported in the frames 70, a spring as 80 at one end of said bracket serving to maintain the rolls 74 and 75 in operative engagement. The shaft 77 is continuously driven in a suitable manner, as by means of the sprocket wheel 81 at the end thereof and the chain 82 (Fig. 2), the gear 83 on said shaft 77 meshing with and driving the gear 84 on the shaft 76. The web 73 is drawn off the paper roll 68 and advanced by the advancing rolls sufficiently to provide the slack portion or loop 85 at all times between said rolls and the intermittently operated rolls 86 and 87, on the shafts 88 and 89 respectively. Said shaft 89 is supported by the brackets 90 loosely mounted on the rock shaft 91, whereby the brackets and the shaft 89 carried thereby are unaffected by the rotation of said rock shaft. Rotation of the shaft 88 causes rotation of the shaft 89 through the respective intermeshing gears 92 and 93 on said shafts, which are given intermittent movement for forwarding a predetermined length of the web 73 of patching material to be severed, as follows:

The gear 94 is loosely mounted on the shaft 91, being unaffected by the rotation of said shaft, and engages the gear 95 secured to the shaft 88. Secured, as by means of the bolts 97 to the gear 94, is the ratchet wheel 96, intermittently operated by the pawl 98, on the oscillatory movement of the arm 99. The cam 100 serves to oscillate said arm 99 through the roller 101 at the end of said arm and engaging the edge of said cam. It will be seen therefore that rotation of the cam 100 serves to cause the rolls 86 and 87 to advance a predetermined length of the transparent web of paper, the slack portion 85 in said web being constantly maintained for preventing undue tension on said web. The web portion to be severed, as it is intermittently advanced by the rolls 86 and 87 passes in front of the stationary knife blade 102 ready to be cut off to the proper length by the oscillatory knife blade 103 mounted on the rocker arm 104. Said arm is secured to the rock shaft 91, which is oscillated through the cam 105 on the shaft 77 and the roller 106 engaging said cam and supported by the bracket 107 secured to said rock shaft. It will be understood that the cam 105 is so designed as to give the rocker arm 104 and the blade 103 carried thereby the proper stroke to sever the transparent web by the coaction of the stationary and movable knife blades, and that the patch to be severed is maintained stationary during the severing operation.

Means are provided, designed to operate efficiently at high speeds, for gripping the lower edge of the patch of transparent material just before it is severed as above described. Means are also provided for forwarding the severed patch, and for applying said patch to the moving blank on the plate 55. The patch gripping means includes the gripper carrier 108 revolubly and loosely mounted on the shaft 109, and is given alternately an accelerated and retarded rotative movement designed to maintain said carrier momentarily stationary during the patch severing operation. Frame arms 110, suitably secured as at 111 to the auxiliary frames 70, support the shaft 109, which is continuously rotated by means of the sprocket wheel 112 and the chain 113 engaging said wheel. The carrier 108 is secured to the long sleeve 114, which is freely mounted on the shaft 109. Secured to the sleeve 114 is the crank 115, which is operatively connected to one arm 116 of the bell crank lever 117, as by means of the link 118. The other arm 119 of said bell crank lever carries the roller 120 at the end thereof, said roller operating in a suitable groove 121 in the stationary cam 122 secured to the frame arm 110 as by means of the bolts 123. The cam groove 121 is so shaped as to oscillate the bell crank lever 117 and therethrough to oscillate the sleeve 114 and the gripper carrier 108, while all of said parts are at the same time substantially continuously rotated. It will be seen therefore that the continuous rotation of the carrier 108 is accelerated and retarded alternately, the retarding action at one point being, if desired, of sufficient amount to stop momentarily, or to substantially stop the rotary movement of said carrier for the purpose of gripping the lower edge of the patch about to be severed.

In view of the high speed of operation of the machine, it is highly desirable that control of the severed patch be retained at all times. It is therefore advisable to mount a gripping lever 124 upon the carrier 108 and to cause said gripping lever to grip the patch at the instant before the patch is severed from the web. As the carrier 108 therefore, is brought into the path of the lowermost part of the web, the gripping lever 124 is in its open position and allows the web to pass between it and the cylindrical surface 125 of the carrier. For this purpose the cam groove 121 is so shaped that the carrier 108 is practically at a standstill when the lower edge of the web enters the space between the open gripping lever 124 and the surface 125. Immediately before the web is severed by the blades 102 and 103, the gripping lever 124 is released and allowed to coact with the surface 125 to grip the web by means which will now be described.

The gripping lever is pivoted to the bar 126, which is secured as by the bolts 127, to the carrier 108, and which is normally urged toward its gripping position by means of a suitable spring 128. A pin 129 at and projecting from one end of said gripping lever engages the arm 130 mounted on the shaft 131. A suitable extension 132 projects from the remainder of the carrier 108 and serves to rotatably support the shaft 131. In the normal position of the parts, the pin 129 engages the arm 130 and maintains the gripping lever 124 in its open or inoperative position. It will be understood that the carrier 108, the gripping lever 124, the arm 130 and the cam roller arm 133 on the shaft 131, as well as said shaft are all rotated as a unit together with the sleeve 114, and are retarded and accelerated together, so that no movement of the gripping lever 124 occurs unless and until the shaft 131 is rotated and the arm 130 removed from the path of the pin 129 on the gripping lever. Such removal of the arm 130 is effected before the web is severed, and immediately after the web has entered the normally open space between the gripping lever 124 and the surface 125. The mechanism for allowing the closing of the gripping lever 124 upon the web includes the cam roller 134 at the end of the roller arm 133, which roller engages the normally stationary cam 135, loosely mounted about the sleeve 114. Said cam is normally held stationary by means of the link 136 secured thereto at one end 137, and having a cam roller 138 at the other end thereof engaging the cam 139 secured to the continuously rotating shaft 140. The cam 139 is so shaped that at the instant that the carrier 108 is retarded to the maximum in its rotation and is therefore practically stationary to allow the entrance of the web into the grip of the gripping lever 124, the link 136 is operated by said cam and causes slight rotation of the cam 135, whereby the roller arm 133 and the shaft 131 are slightly rotated and the arm 130 removed from engagement with the gripper pin 129. The spring 128 is then free to pull the gripping lever 124 toward the surface 125 of the carrier 108, and the web is gripped before the severing blades cut off the patch.

To insure the retention and control of the patch, I prefer to provide an additional patch engaging finger 141 secured to the shaft 142, which is oscillated at the proper moment by the cam 143 on the shaft 140, through the roller 144, and the roller arm 145 on the shaft 142. The cam 143 is so designed as to rock the shaft 142 after the web has passed between the gripping member 124 and the surface 125, whereby said patch is held by said finger 141 against the surface 125 until the gripping lever is released and closed upon the patch in the manner hereinbefore described. After the patch has been severed and is securely held in place on the surface 125 by the gripping lever, the cam 143 serves to return the finger 141 to its initial position ready for the repetition of the operation.

Continued rotation of the carrier 108 past the patch gripping position at the extreme right as viewed in Fig. 3, does not cause the gripping lever to release the patch until the carrier 108 and the gripping lever thereon reach their lowermost positions in which the patch is ready to be transferred to the suction drum 146. In the latter position, the cam 139 again operates the cam 135 to bring the arm 130 against the pin 129 against the action of the spring 128 whereby the gripping lever is opened and the patch released, after which the carrier is accelerated in its rotary movement by the cam 122.

The mechanism for transferring the patch from the gripping lever to the blank will now be described. The opening 147 made in the suction drum 146, communicates with the preferably radial openings 148 in said drum and with the substantially semicircular curved opening 149 in the stationary suction valve 150. For continuously withdrawing air from the opening 149, a suitable pipe 151, communicating at one end with the said opening and at the other end with a suction pump of the usual type, is secured to the suction valve 150. It will be seen that air is withdrawn from the opening 147 and 148 only when said opening 147 registers with and communicates with the valve opening 149. This occurs for substantially half of a revolution of the shaft 140, which shaft and the suction drum 146 thereon are continuously rotated by means of the gear 152 on the shaft 140, which gear meshes with and is continuously driven by the gear 153 on the shaft 109. The suction valve 150 is stationary and is held in position by means of the strap 154 secured at one end to the projecting lug 155 of the valve 150, and at the other end being loosely mounted on the shaft 142.

Figure 11:
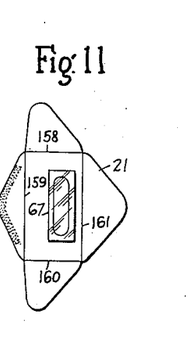
Fig. 11 is a similar view of the blank after it has been scored preparatory to folding.
Figure 12:
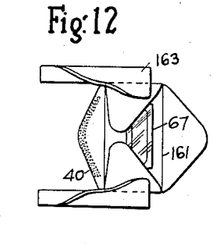
Fig. 12 is a similar view of the blank showing the step of folding the side flaps.

As the gripping member 124 releases the patch, the openings 148 are arranged directly underneath said patch, and the opening 147 communicates with the valve opening 149. The suction in the openings 148 therefore causes the patch to adhere to the suction drum 146. Rotation of said drum carries the patch down to the previously gummed blank on the plate 55 and presses said patch in position about the window opening without stopping the blank in its movement. Immediately thereafter the opening 147 passes the end of the openng 149 and the suction in the openings 148 ceases, whereby the patch is released. The blank continues forward by the action of the pins 56, to the scoring roller 156. Said roller is provided with the scoring blades 157 suitably arranged to score the blank on the lines 158, 159, 160 and 161 (Fig. 11) preparatory to the folding of the various flaps. A roller 162 of yieldable material is provided to cooperate with the scoring blades 157 in the usual manner, the cooperating scoring rollers serving to advance the patched blank to the folding mechanism.

Figure 13:
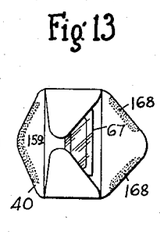
Fig. 13 is a similar view showing the next step in the process consisting of gumming the bottom flap.
Figure 14:
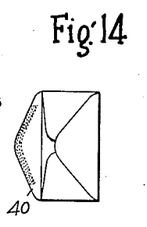
Fig. 14 is a similar view showing the bottom flap folded.
Figure 15:
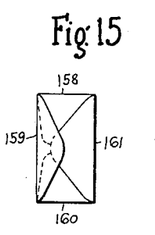
Fig. 15 is a similar view showing the finished envelope.
Figure 16:
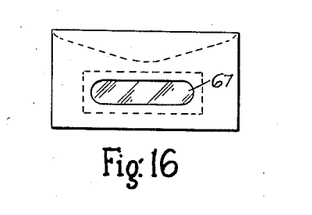
Fig. 16 is a front view of the finished envelope.

For folding the side flaps of the blank, the curved guide 163 is provided, said guide first throwing up said side flaps at an angle to the remainder of the blank and then turning the side flaps down on to the uppermost face of the blank. The rollers 164 and 165 serve to accentuate and make permanent the fold on the score lines 158 and 160 and serve further to forward the blank along the plate 166 into the path of the gumming roll 167 for applying gum in strips 168 (Fig. 13) of predetermned shape and extent to the upper surface of the bottom flap. The segmental roller 169 coacting with the roller 170 allows the blank to pass between said rollers without interference with the wet bottom flap and then forwards the blank to the rocker arm 171. The bottom flap climbs up on and is partly turned over by said rocker arm, which is then moved out of the path of the lowermost partly folded part of the blank while nevertheless pressing down on the bottom flap just above the score line 161 for partly folding over said bottom flap on to the side flaps. The rollers 172 and 173 complete the folding of the bottom flap and forward the blank to the cooperating rollers 174 and 175. The last mentioned rollers advance the blank to the stationary inclined plate 176 and below the rocker blade 177 but retain their grip on the seal flap until the rocker blade 177 is swung downwardly and thereby partly folds the seal flap about the score line 159. The oscillatory finger 178 then moves the blank with its partly folded seal flap at the proper moment between the rollers 175 and 179, the parts being so arranged that the seal flap is first gripped by said rolls precisely on the score line 159 and the seal flap thereby folded down in place. The finished envelope thereby passes between said rollers 175 and 179 past the roller 180 on to the table 181, being aided in the movement thereof by the oscillatory blade 182.

It will be seen that I have provided a method for making window envelopes at high speed from blanks maintained continuously in motion and that I have further provided an improved machine for effectively and rapidly carrying out the steps of my method. It will be understood that I do not intend to be limited to the specific steps and mechanism shown and described herein since various changes therein are contemplated and may be made without departing from the spirit and scope of this invention and the range of equivalents afforded by the appended claims, but that I intend to claim my invention as broadly as may be permitted by the state of the prior art.

I claim:

1. The method of making window envelopes, comprising continuously advancing envelope blanks in flat overlapping relation with the seal flaps thereof exposed and trailing, gumming the exposed seal flaps, moving the blanks so overlapped and gummed continuously for a sufficient period to dry the gummed seal flaps while retaining full control of each blank, separating the blanks from their overlapped position, applying gum about the periphery of the window opening of the blank, severing a patch of transparent material and applying the patch to the gummed window opening during the continuous movement of the blank after the seal flaps have dried and before the blank is folded, and completing the folding of the blank into an envelope while said blank is in motion.

2. The method of making window envelopes, consisting of continuously overlapping and continuously feeding blanks flat into position for gumming, gumming the seal flap of the blanks having window openings cut therein while the blanks are in continuous motion, applying a patch to the window opening of each blank during the continuous movement of said blank before the blank is folded and completing the folding of the side, bottom and seal flaps to form an envelope while the blank is in motion.

3. The method of making window envelopes consisting of the provision of a stack of previously shaped blanks having window openings cut therein, removing one blank at a time from the top of the stack, advancing the blanks by continuous movement thereof in flat overlapped relation with the seal flaps thereof exposed, gumming the seal flaps so exposed, separating the overlapped blanks and advancing them continuously in spaced relation and applying a patch of transparent material to the blanks during the movement of said blanks, and before the blanks are folded.

4. The method of making window envelopes comprising continuously advancing a series of blanks provided with window openings in flat overlapped relation, separating the leading blank from the remaining overlapped blanks while continuing the advance of the separated blank at a higher speed, severing a patch of transparent material of predetermined size from a roll and applying said patch to the window of the separated blank while the blank is in motion the leading blank being maintained at the top of the overlapped blanks during the patch applying operation, and later folding the blanks during the movement thereof.

5. The method of making window envelopes comprising removing blanks from the top of a stack and continuously advancing the blanks in flat overlapped relation, separating the leading blank from the remainder of the overlapped blanks while all of said blanks are in motion, applying a patch to the window of the separated blank during the movement thereof and before the folding thereof, and creasing and folding the blank into an envelope during the continuous movement thereof after the patch has been applied thereto, the spacing of the blanks being positively controlled at all times.

6. The method of making window envelopes from cut blanks comprising continuously advancing said blanks in overlapped relation while retaining control of each of said blanks, separating the leading blank from the remainder of the overlapped blanks by giving the blanks so separated a higher continuous speed than the remaining blanks while retaining complete control thereof, applying a patch to the separated blank and later folding the side and bottom flaps of the blank while the blank is moved continuously.

7. In a machine for making window envelopes, means for removing one blank at a time from the top of a stack in rapid succession, means for feeding the blanks in overlapped relation with the seal flaps thereof exposed at the rear of the overlapped blanks, means for continuously gumming the exposed seal flaps, continuously moving means for gripping each of said blanks individually while maintaining said blanks in overlapped relation, means for separating the leading blank from the remaining blanks intermittently operating means for severing a patch from a roll, a revoluble suction cylinder for applying the severed patch to the separated blank while said blank is in motion, means for creasing said blank, and means for folding said blank.

8. In a machine for making window envelopes, means for continuously advancing a blank, means for gumming the seal flap of said blank, means for applying a patch to the blank including intermittently operated rolls for advancing a predetermined length of patch material at a time, cooperating blades for severing the patch from said material, a gripper for gripping the patch, a drum having suction openings therein for receiving the patch from said gripper and for applying the patch to the window of the blank, and means for folding the patched blank.

9. In a machine for making window envelopes, means for continuously advancing blanks having window openings made therein from a stack while retaining full control of the blanks, means for separating said blanks during the continuous advance thereof, means for severing a patch from a roll means for simultaneously aligning and pushing upon a blank for imparting continuous linear movement thereto, a suction drum for applying the severed patch to the window of a blank during the linear movement thereof, and means for folding the patched blank during the continuous advance thereof.

10. In a machine for making window envelopes, means for gumming the seal flaps of a series of overlapped blanks, means for separating the blanks, operating means for severing a patch from a roll, means for simultaneously aligning and continuously advancing a blank, means for applying the severed patched to the window of a blank during the advance thereof and means for folding the patched blank during the advance thereof.

11. In a machine for making window envelopes, cooperating blades for severing a patch from a roll, means for gripping the patch before the severance thereof, for advancing said patch and for releasing said patch after the advance thereof, air controlled means for forwarding and applying the patch to the window of a blank moving along a straight line, and means for folding the patched blank.

12. In a machine for making window envelopes, means for continuously advancing blanks having window openings therein, in overlapping relation, means for separting said blanks, means for severing a patch from a roll, air controlled means for applying the severed patch about the window of a blank during the movement of the blank, and means for advancing and for folding the patched blank.

13. In a machine for making window envelopes, means for continuously advancing a blank having a window opening therein, means for gumming said opening during the movement of the blank, means for applying a patch to the advancing blank, and means for folding the bottom and side flaps of the advancing patched blank and means for reversing the movement of the folded blank and thereby folding the seal flap.

14. In a machine for making window envelopes, means for removing a blank having a window opening therein from the top of a stack with the bottom flap leading and for feeding the succeeding blank underneath the leading blank, means for continuously advancing said blank during the movement thereof, means for gumming the seal flap of the advancing blank, cooperating blades for severing a patch from a roll, means for applying the severed patch to the advancing blank, means for folding the side flaps of the advancing blank, means for gumming the bottom flap of the advancing blank, means for folding the bottom flap of the advancing blank and means for reversing the movement of the blank and folding the seal flap.

15. In a machine for making window envelopes, means for continuously advancing a blank having a window opening therein and having a gummed seal flap, including an endless chain and a pin on said chain engaging the rear corner only of blank, means for gumming the window opening while the blank is advanced by said chain and pin, means for severing and applying a patch to the window opening during the advance of said blank, and means for folding said blank.

16. The method of making window envelopes consisting of overlapping a series of blanks having window openings previously cut therein so as to expose the seal flaps only at the rear edges of the blanks, advancing the overlapped blanks with the edges of the bottom flaps leading and the leading blank overlying the remaining blanks, gumming the rearwardly arranged seal flaps so exposed, maintaining the gummed blanks in position with the gummed seal flaps lowermost for a sufficient period to dry the gummed flaps, separating the blanks, pushing on the blank to impart linear movement thereto, applying a patch to the window opening of each blank during the linear movement thereof, folding the side and bottom flaps of the blank during the continued linear movement thereof, halting the blank and reversing its movement and thereby folding the seal flap.

17. The methtod of making window envelopes consisting of pushing on the rear edge of a blank to impart linear movement thereto and to align the blank while pushing rearwardly with less force on the blank to maintain it in position, severing and applying a patch to the blank while it is being pushed, and folding the blank while it is in motion.

18. The method of making window envelopes, consisting of overlapping blanks with the edges of the bottom flaps leading, the seal flaps exposed at the rear, and the leading blank overlying the remaining blanks, gumming the seal flaps, maintaining the blanks in the same relative positions until the seal flaps are dry, by gripping each blank independently, separating the blanks with the seal flaps thereof arranged at the rear, pushing on and thereby imparting linear movement to the blanks while simultaneously aligning the blanks, severing and applying a patch to the blank during its linear movement, and folding the blank while the movement thereof is continued.

19. The method of making window envelopes, consisting of gumming and drying overlapped blanks while retaining control of the blanks individually, severing a patch from a roll, applying the patch while the blank is moved along a straight path, folding the side and bottom flaps of the blank while its straight-line movement is continued, halting and reversing the movement of the blank and thereby folding the seal flap.

20. In a machine for making window envelopes, means for advancing blanks having window openings therein in overlapped relation with the seal flaps rearwardly and the leading blank uppermost, means for retaining control of the blanks individually in their movement including a chain, a clip on said chain for frictionally gripping each blank, a second chain for the receiving of the blanks from the first chain, and a pin on the second chain for pushing upon each blank, and aligning the blank, and means for applying a patch to the blank while it is being pushed by the pin including patch severing means, means for continuously advancing the blank after the patch has been applied thereto and means for folding the blank during its advance.

21. In a machine for making window envelopes, means for advancing blanks in overlapped relation including a chain and a clip on the chain for gripping each blank and for releasing the blank when the chain is rotated, a second chain for receiving the blank after it has been released by the first chain, means on the second chain for advancing the blank, means for applying a patch to the blank while it is advanced by the second chain, means for continuously advancing the blank after it has been released by the second chain, and means for folding the blank during its continuous advance.

22. In a machine for making window envelopes, means for advancing blanks having window openings therein in overlapped relation, means on said advancing means for spacing said blanks in predetermined relation and for fully controlling the movement of said blanks, a second advancing means for spacing the blanks, said second means including pins for pushing on the rear of a blank, and means for frictionally engaging the surface of the blank for maintaining the blank against the pins, means for applying a patch to the blank during its advance, and means for folding the blank during its advance.

23. In a machine for making window envelopes, means for removing blanks having window openings therein in succession from the top of a stack and for delivering said blanks in overlapped relation, means for continuously advancing said overlapped blanks after the delivery to said means of the blanks from the stack, means for gumming the seal flaps of said blanks, means for engaging the rear part of each blank for maintaining said blanks in predetermined overlapped relation for a predetermined period and for releasing said blanks at the end of said period, means for applying a patch to the window opening of a blank after the release thereof and while the blank is in motion, and means for folding said blank.

24. In a machine for making window envelopes, means for continuously advancing blanks in overlapped relation and for gripping each of said blanks to retain full control thereof, means for applying a patch to the blank while the blank is in motion, and means for completing the envelope during the advance thereof.

25. In a machine for making window envelopes, means for advancing blanks in overlapped relation while retaining full control thereof, means for continuing the advance of said blanks after the release thereof by said first-mentioned means including a chain, a pair of pins on said chain pushing up on the rear corners of a blank, friction means for retarding the advance of the blank and for insuring the engagement of the rear part of the blank by the pins, means for applying a patch to the blank while the blank is controlled by said pins, and means for folding the side flaps and the bottom flap of the blank during the continuous advance thereof.

26. In a machine for making window envelopes, means for overlapping a series of blanks with the seal flaps trailing and exposed, and the remainder of the blanks each covered by a preceding blank, means for applying a patch to the window of the leading blank while it is in motion, means for gumming the blank, and means for folding the patched and gummed blank.

27. In a machine for making window envelopes, means for separating a blank from a series of similar overlapped blanks, means for severing a patch from a roll, means for gripping the severed patch including an accellerated and retarded gripper carrier, a gripper cooperating with said carrier to engage and hold the patch, suction means for receiving the patch from the gripping means, for forwarding the patch and for applying the patch to the window of a blank, and means for folding the patched blank.

28. In a machine for making window envelopes, means for continuously advancing and overlapping blanks having window openings made therein, means for speeding up the advance of and separating the leading blank from the remaining blanks, means for severing a patch from a roll, a suction drum for applying the severed patch to the window of the blank while it is in motion, and means for folding the patched blank.

29. In a machine for making window envelopes, means for gumming the seal flaps of a series of overlapped blanks, means for separating the leading blank from the series while simultaneously aligning the blank, intermittently operating means for severing a patch from a roll, means for applying the severed patch to the window of a blank, and means for folding the patched blank while it is in motion.

30. In a machine for making window envelopes, means for overlapping a series of blanks with the seal flaps thereof exposed and trailing, means for gumming the exposed seal flaps, a pair of rolls, one of which is mutilated for advancing the blanks, said rolls having a greater rim speed than the linear speed of the overlapped blanks for separating the leading blank from the remaining blanks, mechanism for applying a thin transparent patch to the upper surface of the leading blank while it is in motion, and mechanism to fold the blank into an envelope.

31. In a machine for making window envelopes, a pair of belts, a suction picker for feeding blanks from a stack, in succession, with the blank underneath the succeeding blank and the seal flaps of the blanks thus overlapped trailing and exposed, each blank having a window opening cut therein between said belts, means for advancing the belts while maintaining said belts tensioned to advance the series of overlapped blanks flat, means for gumming the exposed seal flaps of the blanks, means for applying a patch to the leading blank, and means for folding the patched blank into an envelope while the blank is in motion.

32. In a machine for making window envelopes, a pair of belts having portions thereof moving in the same direction and adjacent each other for maintaining a series of overlapped blanks flat and advancing said blanks, means for gripping each blank and maintaining the overlapped blanks in their relative overlapped positions, means for applying a patch to each blank while the blank is in motion, and means for completing the gumming and folding of the blank while the motion thereof is continued.

33. In a machine for making window envelopes, a pair of belts for advancing a series of overlapped blanks while maintaining said blanks flat, means for separating the leading blank from the remaining blanks while all of said blanks are in motion, means for applying a patch to the upper surface of the leading blank while it is in motion, and means for completing the gumming and folding of the blank to form an envelope with the patch on the inside while the motion of the blank is continued.

34. In a machine for making window envelopes, means for removing one blank at a time from a stack of blanks having window openings cut therein, for overlapping said blanks with each blank underneath the preceding blank, and for advancing the overlapped blanks while maintaining them flat, means for applying a patch to each of said blanks while said blanks are in motion, said patch applying means including a revoluble carrier and a pivoted lever cooperating with said carrier to grip a patch severed from a web therebetween, and a suction drum for transferring the severed patch from the gripping means to the blank, and means for completing the folding and the gumming of the blank into an envelope while the blank is in motion.

35. In a machine for making window envelopes, means for continuously advancing a series of overlapped blanks, means engaging the blanks for maintaining the blanks against displacement from their overlapped positions, means for separating the leading blank from the remaining blanks during the movement of said blanks, friction means engaging the uppermost surface of the leading blank to aid in its alignment, and means for applying a patch to the leading blank while the motion thereof is continued.

36. In a machine for making window envelopes, means for continuously advancing a series of overlapped blanks, and means for separating the leading blank from the remaining blanks and for aligning said leading blank comprising pins movable at a greater speed than the overlapped blanks for engaging the rear corners of the leading blank, and a friction device engaging the upper surface of the blank and resisting without halting, the advance thereof, and means for applying a patch to the leading blank.

37. In a machine for making window envelopes, means for separating a blank from a series of moving overlapped blanks, means for applying a patch to the separated blank while it is in motion, including a pair of cooperating knives for severing a patch from a roll, revoluble means for gripping said patch and for transferring the severed patch, a suction drum for receiving the severed patch, valve means cooperating with the suction drum for applying suction to the patch to retain it on the drum until said patch has been applied to the blank, and for then cutting off the suction to release the patch, and means for completing the gumming and folding of the blank into an envelope.

38. The method of making window envelopes comprising continuously advancing a blank previously formed with a window opening, gumming the seal flap of the blank during its advance, turning the blank over during its advance to dry the gummed seal flap, turning the blank again after the seal flap has dried, applying a patch to the window opening during the continuous movement of the blank, and folding the blank to finish the envelope while the blank is in motion, while at no time stopping the blank until the envelope has been completed and the seal flap folded.

39. The method of making window envelopes comprising inserting a blank under a preceding blank with the seal flap at the rear and exposed until a series of blanks have been overlapped, gumming and drying the exposed seal flaps, separating the leading flap from the series, severing a patch of transparent material from a roll and applying said patch to the window opening of the separated blank while said blank is in continuous motion, creasing the blank, folding the side flaps thereof, folding the bottom flap and folding the seal flap.

40. A continuous method of making window envelopes, consisting of moving a blank continuously throughout the steps hereinafter mentioned, arranging similar blanks under the moving blank to expose the seal flap of the blanks only, gumming the seal flaps of the blanks continuously as the blanks are moved, applying a patch to the window opening of the leading blank, and then completing the folding of the side, bottom and seal flaps to form an envelope.

41. The method of making window envelopes comprising continuously advancing a series of blanks provided with window openings in overlapped relation while controlling each blank by gripping it, releasing and separating the leading blank from the remaining overlapped blanks and continuing the advance of the separated blank at a higher speed, severing a patch of transparent material from a roll, applying the patch to the window of the separated blank while the blank is in motion, and then completing the folding of the blank while its motion is continued.

42. The method of making window envelopes comprising removing blanks from the top of a stack and advancing the blanks in overlapped relation first with the leading blank uppermost, then undermost, then again uppermost, separating the leading blank from the remainder of the overlapped blanks while continuing the advance of all of said blanks, applying a patch to the window of the separated blank during the movement thereof, and creasing and folding the blank into an envelope during the continuous movement thereof after the patch has been applied thereto.

ABRAHAM NOVICK.